(12) United States Patent
Matsubara et al.

(10) Patent No.: US 11,059,134 B2
(45) Date of Patent: Jul. 13, 2021

(54) ALLOY FOR OVERLAY WELDING AND REACTION TUBE

(71) Applicant: KUBOTA CORPORATION, Osaka (JP)

(72) Inventors: Motoyuki Matsubara, Hirakata (JP); Kunihide Hashimoto, Hirakata (JP); Hiroshi Yamaguchi, Hirakata (JP); Masayuki Tomita, Hirakata (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 16/092,631

(22) Filed: Oct. 10, 2018

(65) Prior Publication Data

US 2019/0291219 A1    Sep. 26, 2019

Related U.S. Application Data

(63) Continuation-in-part of application No. PCT/JP2017/036070, filed on Oct. 4, 2017.

(51) Int. Cl.
   *B23K 35/30* (2006.01)
   *B23K 10/02* (2006.01)
   (Continued)

(52) U.S. Cl.
   CPC .......... *B23K 35/3066* (2013.01); *B23K 10/02* (2013.01); *B23K 35/30* (2013.01);
   (Continued)

(58) Field of Classification Search
   CPC .. B23K 35/3066; B23K 35/304; B23K 10/02; C22C 30/00; Y10T 428/12146
   See application file for complete search history.

(56) References Cited

U.S. PATENT DOCUMENTS

| | | | |
|---|---|---|---|
| 2009/0180935 A1 | 7/2009 | Higuchi | |
| 2010/0143206 A1* | 6/2010 | Hashimoto | B01J 19/006 422/129 |
| 2011/0318593 A1* | 12/2011 | Takahashi | C21D 6/004 428/469 |

FOREIGN PATENT DOCUMENTS

| | | |
|---|---|---|
| CN | 101484770 A | 7/2009 |
| EP | 1 043 084 A2 | 10/2000 |

(Continued)

OTHER PUBLICATIONS

[Machine Translation] Japanese Unexamined Patent Publication 2016-132019 (corresponds to JP 2016-132019 cited above), Jul. 25, 2016, 19 pp. (English language translation).

(Continued)

*Primary Examiner* — Daniel J. Schleis
*Assistant Examiner* — Kevin Ct Li
(74) *Attorney, Agent, or Firm* — Eckert Seamans Cherin & Mellott, LLC

(57) ABSTRACT

The present invention provides an alloy for overlay welding with which an alumina barrier layer containing an Al oxide can be formed on a projection that is overlay welded on an inner surface of a reaction tube, and a reaction tube having a projection that is overlay welded on the inner surface as a stirring member.

An alloy for overlay welding according to the present invention is an alloy for overlay welding that is to be used in overlay welding, and the alloy contains C in an amount of 0.2 mass % to 0.6 mass %, Si in an amount of more than 0 mass % to 1.0 mass %, Mn in an amount of more than 0 mass % to 0.6 mass % or less, Cr in an amount of 25 mass % to 35 mass %, Ni in an amount of 35 mass % to 50 mass %, Nb in an amount of 0.5 mass % to 2.0 mass %, Al in an amount of 3.0 mass % to 6.0 mass %, Y in an amount of 0.005 mass (Continued)

% to 0.05 mass %, and Fe and inevitable impurities as a remaining portion.

18 Claims, 5 Drawing Sheets

(51) Int. Cl.
*C22C 38/00* (2006.01)
*C22C 19/05* (2006.01)
*C22C 38/40* (2006.01)
*C22C 30/00* (2006.01)
*C22C 38/50* (2006.01)

(52) U.S. Cl.
CPC ............ *B23K 35/304* (2013.01); *C22C 19/05* (2013.01); *C22C 30/00* (2013.01); *C22C 38/00* (2013.01); *C22C 38/50* (2013.01); *Y10T 428/12146* (2015.01)

(56) References Cited

FOREIGN PATENT DOCUMENTS

| EP | 3 239 311 A1 | 11/2017 |
|---|---|---|
| JP | 09-243284 | 9/1997 |
| JP | H09243284 | * 9/1997 |
| JP | 2008-249249 | 10/2008 |
| JP | 2012-505314 A | 3/2012 |
| JP | 2016-132019 | 7/2016 |
| JP | 2016 223017 A | 12/2016 |
| WO | 2010/043375 A1 | 4/2010 |
| WO | 2010/113830 A1 | 7/2010 |
| WO | 2016/104417 A1 | 6/2016 |

OTHER PUBLICATIONS

[Machine Translation] Japanese Unexamined Patent Publication HEI 09-243284 (corresponds to JP 09-243284, cited above), Sep. 19, 1997, 12 pp. (English language translation).
Japanese Patent Office, "International Search Report" (with English language translation), from corresponding publication WO 2018/088069 A1 (PCT/JP2017/036070), May 5, 2018, 2017, 2 pp.
European Patent Office, "extended European search report", from corresponding European Patent Application No. EP 17 87 0473, dated Apr. 24, 2020, 6 pp.
Chinese Patent Office, "Chinese Office Action" for corresponding Chinese Patent Application No. 201780069461.6, dated Aug. 28, 2020, 9 pp.

* cited by examiner

F I G. 1
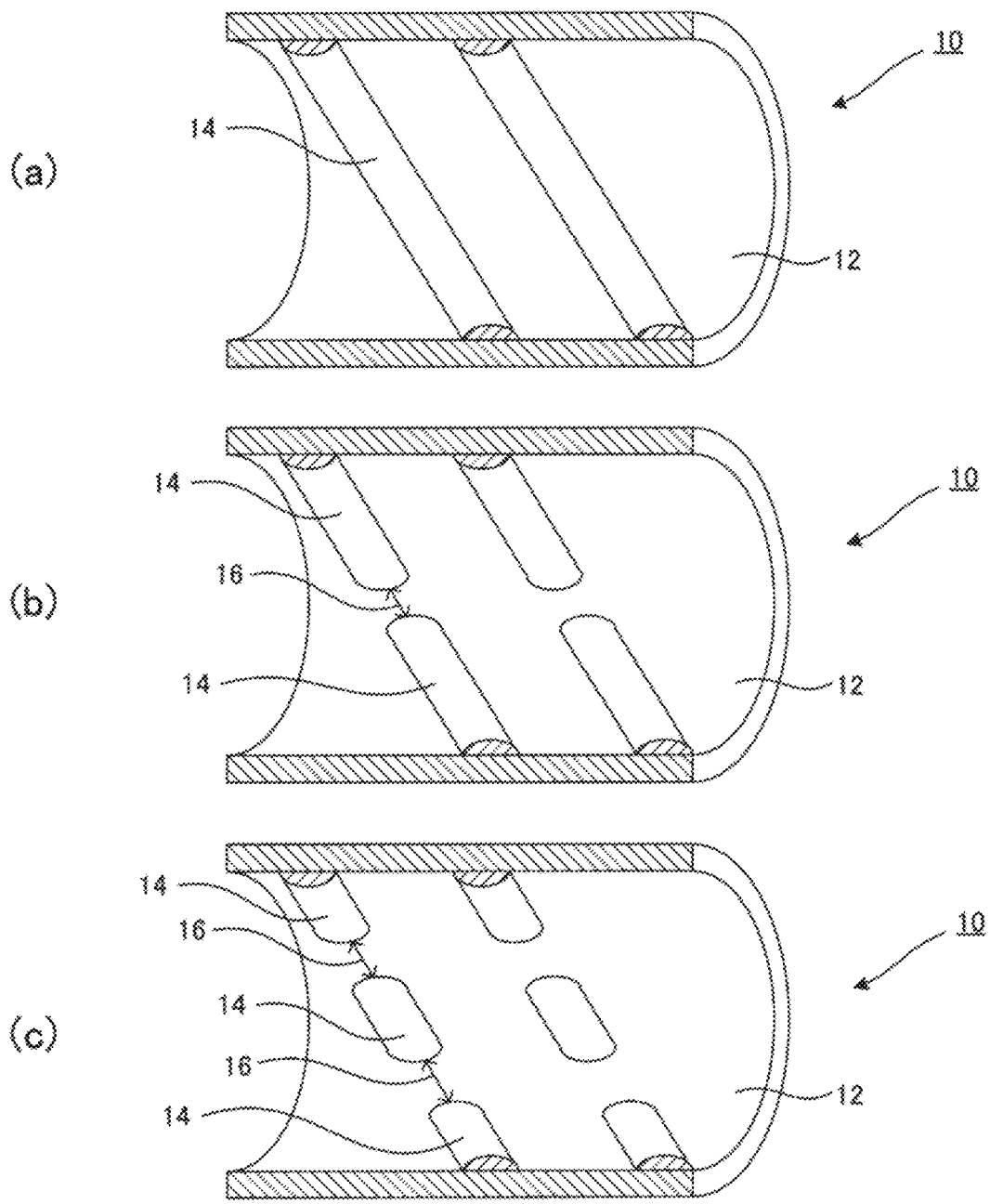

F I G. 4
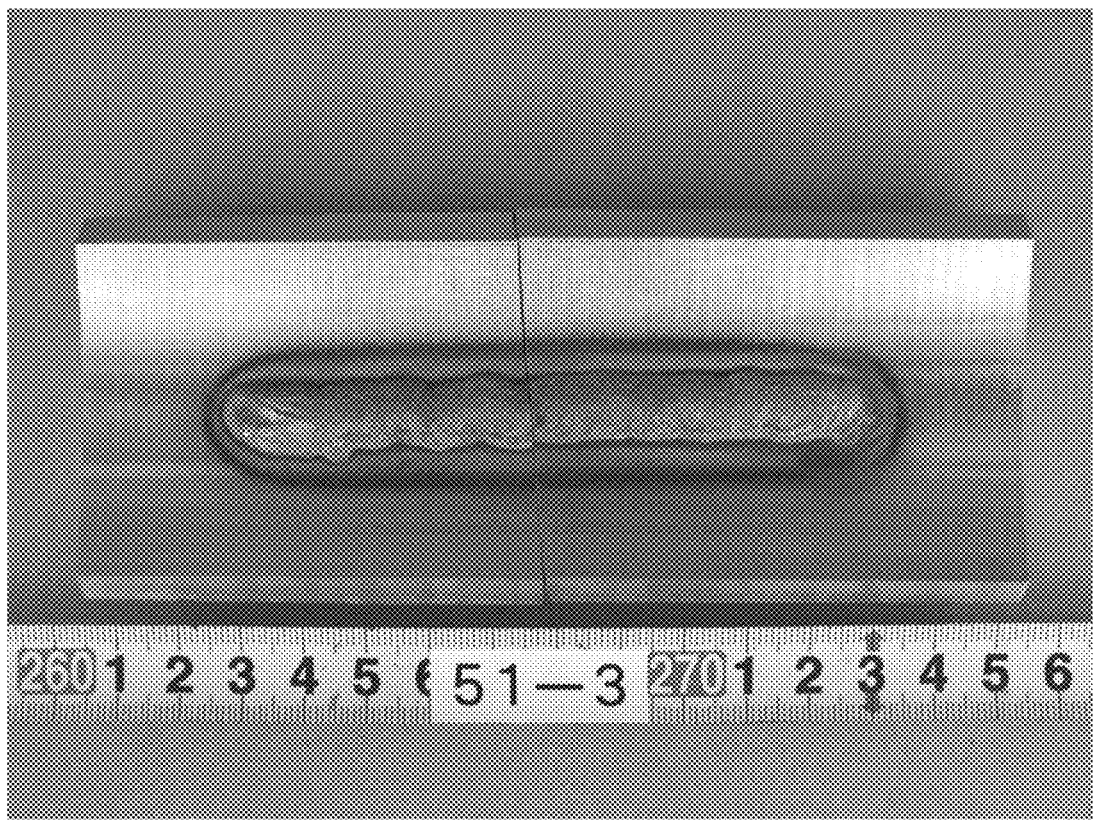

F I G. 5
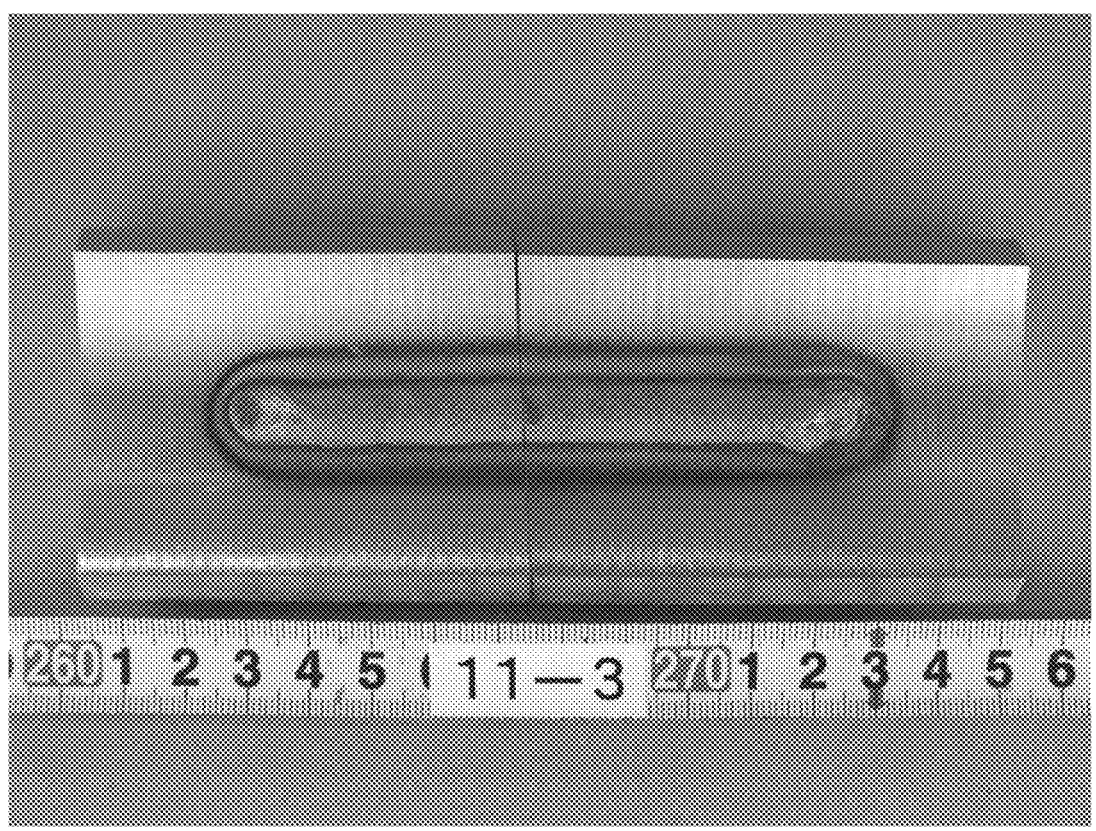

ALLOY FOR OVERLAY WELDING AND REACTION TUBE

BACKGROUND OF THE INVENTION

1. Field of the Invention

The present invention relates to an alloy for overlay welding and powder for welding that are to be used in overlay welding, and a reaction tube provided with a projection that is overlay welded on an inner surface as a stirring member.

2. Description of Related Art

Olefins such as ethylene and propylene are produced by causing raw material fluid of hydrocarbon gas (naphtha, natural gas, ethane, or the like) to flow through a reaction tube heated from the outside, and thermally cracking the raw material fluid by heating the raw material fluid to a reaction temperature range.

The reaction tube is exposed to a high-temperature atmosphere, and tends to be influenced by oxidation, carburization, nitridization, and the like by the flowing gas, and thus there is a demand to apply, to the reaction tube, a material with excellent resistance to these. In view of this, in Patent Document 1, the applicant proposes a reaction tube in which an inner surface of a tube main body is provided with an alumina barrier layer containing an Al oxide.

The formation of the alumina barrier layer on the inner surface of the tube main body makes it possible to realize excellent oxidation resistance, carburization resistance, nitridization resistance, and the like during use in a high-temperature atmosphere.

On the other hand, the reaction tube needs to have a high heat transfer efficiency and a reduced pressure loss. In view of this, in Patent Document 2, the applicant proposes a reaction tube in which an inner surface of the tube main body is provided with helical projections as stirring members. 25Cr—Ni (SCH22), 25Cr-35Ni (SCH24), and Incoloy (brand name) are disclosed as the material of the helical projections, and the projections are formed on the inner surface of the tube main body through overlay welding.

CITATION LIST

Patent Document
  [Patent Document 1] WO 2010/113830
  [Patent Document 2] JP 2008-249249A

SUMMARY OF THE INVENTION

The projections are formed on the inner surface of the tube main body, whereby an increase in the heat transfer efficiency and a decrease in the pressure loss are achieved. However, the projections protrude from the inner surface of the tube main body, and thus the projections are more exposed to gas compared to the inner surface of the tube main body, whereby the projections tend to be influenced by oxidation, carburization, nitridization, and the like. Also, there is a risk that coke generated by alteration or cracking hydrocarbon gas will attach to the surfaces of the projections, and the heat transfer efficiency will decrease or pressure will be lost. Moreover, there is a risk that the frequency of a decoking task for removing attached coke will increase, and the operation efficiency will decrease.

An object of the present invention is to provide an alloy for overlay welding with which an alumina barrier layer containing an Al oxide can be formed on a projection that is overlay welded on an inner surface of a reaction tube, powder for welding, and a reaction tube having a projection that is overlay welded on the inner surface as a stirring member.

The alloy for overlay welding according to the present invention is
an alloy for overlay welding that is to be used in overlay welding, the alloy containing:
C in an amount of 0.2 mass % to 0.6 mass %, Si in an amount of more than 0 mass % to 1.0 mass %, Mn in an amount of more than 0 mass % to 0.6 mass % or less, Cr in an amount of 25 mass % to 35 mass %, Ni in an amount of 35 mass % to 50 mass %, Nb in an amount of 0.5 mass % to 2.0 mass %, Al in an amount of mass % to 6.0 mass %, Y in an amount of 0.005 mass % to 0.05 mass %, and Fe and inevitable impurities as a remaining portion.

The alloy for overlay welding may further contain a rare earth element in an amount of 0.01 mass % to 0.20 mass %.

The alloy for overlay welding may further contain one or more elements selected from the group consisting of W in an amount of more than 0 mass % to 2.0 mass % or less, Mo in an amount of more than 0 mass % to 1.0 mass % or less, Ti and/or Zr in a total amount of more than 0 mass % to 0.5 mass % or less, and Hf in an amount of more than 0 mass % to 0.5 mass % or less.

Powder for welding of the present invention is made of the alloy for overlay welding.

A reaction tube provided with an inner surface projection of the present invention is
a reaction tube provided with an inner surface projection that has a projection that is overlay welded on an inner surface of a tube main body,
in which the tube main body is made of a heat-resistant alloy containing Al in an amount of 2.0 mass % or more and Nb in an amount of more than 0 mass % to 1.0 mass % or less, and
the projection is made of the alloy for overlay welding.

The projection may contain Nb in a concentration that is higher than that of the tube main body.

The projection may contain Al in a concentration that is higher than that of the tube main body.

It is desirable that a surface of the projection has an alumina barrier layer containing an Al oxide.

It is desirable that the inner surface of the tube main body has an alumina barrier layer containing an Al oxide.

The alloy for overlay welding contains a large amount of Al, and thus tends to cause deterioration in the weldability and elongation. Also, the main body of the reaction tube needs to contain a large amount of C in order to increase the creep strength, whereas the weldability decreases due to a large amount of C and the elongation decreases. However, in the present invention, because the alloy for overlay welding and the powder for welding contain Nb, Nb binds to C during welding so as to form NbC, and thus the carbon concentration in a welding material can be reduced, the weldability is increased, and cracking during welding is prevented. Also, Nb included in the projections formed through welding forms NbC (niobium carbide) during welding and can increase the creep strength through crystal boundary strengthening. Also, when oxides of the projections are removed by blast processing or the like, the projections with better linearity enable easy removal of oxides and the ability of forming an Al oxide can be improved. By suitably forming the alumina barrier layer on the projection, the reaction tube is capable of preventing coking and increasing the thermal cracking efficiency, and thus is capable of increasing the yield of olefins.

Also, C in the formed projection forms NbC with priority, and thus it is possible to suppress formation of Cr carbide, as a result of which it is possible to promote the formation of the Al oxide on the projection through heat treatment. Because the alumina barrier layer is formed on the projection, the reaction tube is capable of also suppressing attachment of coke, preventing pressure loss and a decrease in the heat transfer efficiency, and also preventing a decrease in the operation efficiency caused by a decoking task.

BRIEF DESCRIPTION OF THE DRAWINGS

FIG. 1 is a cross-sectional view of a reaction tube provided with an inner surface projection in the tube axis direction according to one embodiment of the present invention.

FIG. 4 is a photograph of Comparative Example 2.
FIG. 5 is a photograph of Comparative Example 3.

DETAILED DESCRIPTION OF THE INVENTION

Figure 2:
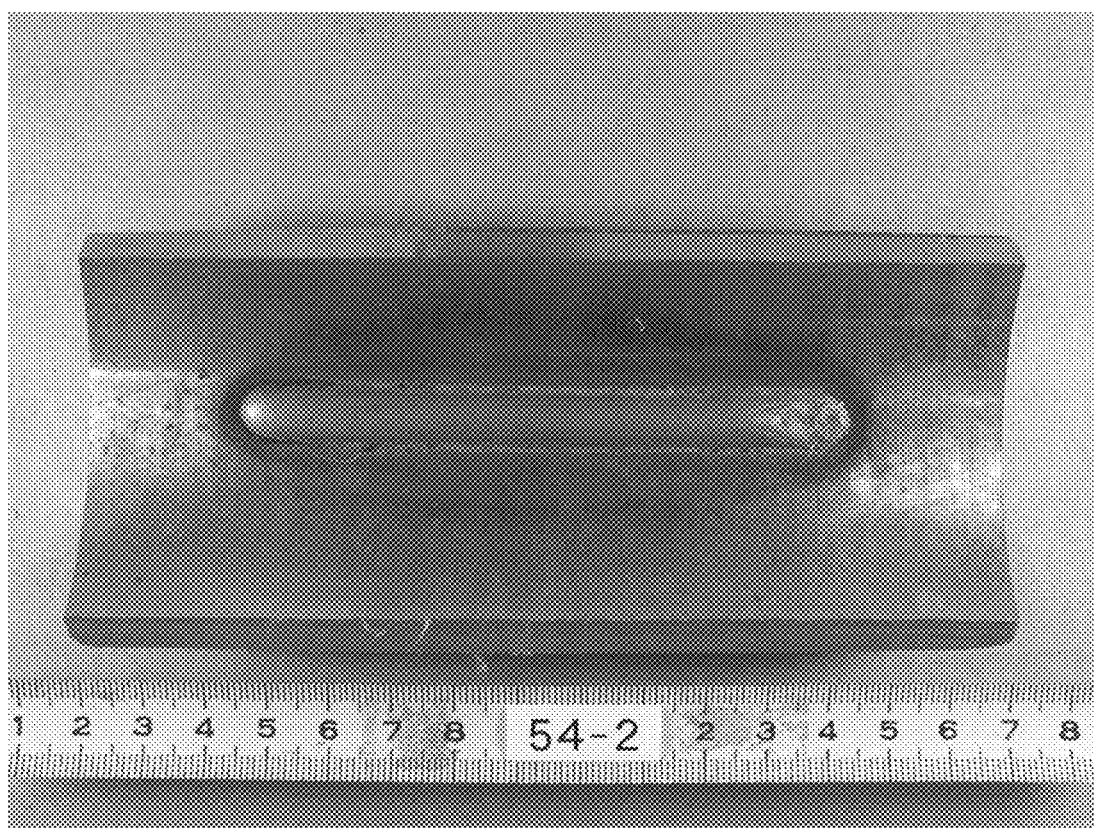
FIG. 2 is a photograph of Inventive Example 3.

Hereinafter, an embodiment of the present invention will be described in detail. Note that unless otherwise stated, "%" means mass %.

An alloy for overlay welding of the present invention can be used as the material of a projection that is overlay welded on an inner surface of a reaction tube such as a thermal cracking tube for manufacturing ethylene, a thermal cracking tube for thermally cracking olefins such as hydrocarbon gas, or a cracking tube for thermally cracking styrene monomer. The reaction tube is disposed in a heating furnace for manufacturing hydrocarbon, for example.

As shown in FIG. 1, a reaction tube 10 provided with an inner surface projection of the present invention is provided with projections 14, which are stirring members, on an inner surface of a tube main body 12. The projections 14 can be formed by overlay welding an alloy for overlay welding, which will be described later, on the inner surface of the tube main body 12.

As shown in FIG. 1(*a*), the projections 14 can be formed as continuous helical projection columns. The number of projection columns can be one or more. Also, FIGS. 1(*b*) and 1(*c*) show the shape in which slits 16 are provided between the projections 14. The slits 16 may be also provided such that they are parallel in the tube axis direction in the adjacent projection columns, or the slits 16 in adjacent projection columns may be shifted in the circumferential surface direction of the tube main body 12. The projections 14 are not limited to being formed as the helical projection columns, and may be formed in an orientation that is perpendicular to the tube axis.

Due to the projections 14 being formed on the inner surface of the tube main body 12, hydrocarbon gas that flows through the inner portion of the tube main body 12 generates a swirl flow that circulates around the circumferential edges of the projections 14 when hydrocarbon gas passes over the projections 14, heat can be exchanged between hydrocarbon gas and the tube main body 12, and the thermal cracking efficiency can be increased as much as possible.

A material containing Al in an amount of 2.0% or more can be used in the tube main body 12. The material contains Al in an amount of 2.0% or more, and thus it is possible to form an alumina barrier layer containing an Al oxide on the inner surface of the tube main body 12 through heat treatment, and the tube main body can exhibit excellent oxidation resistance, carburization resistance, nitridization resistance, and the like during use in a high-temperature atmosphere. The tube main body 12 can be manufactured through centrifugal casting, for example.

Also, the tube main body 12 may contain Nb. Nb binds to C so as to form NbC and can increase the creep strength due to grain boundary strengthening. However, even though Nb is added to the tube main body 12 in an amount of 1.0% or more, the effect is not further improved, and thus even though the tube main body 12 contains Nb, it is desirable that the tube main body 12 contains Nb in an amount of more than 0% to 1.0% or less. Note that the Nb content is more desirably 0.5% or less.

Examples of this type of material include a material containing C in an amount of 0.40% to 0.60%, Si in an amount of more than 0% to 1.0% or less, Mn in an amount of more than 0% to 1.0% or less, Cr in an amount of 22% to 28%, Ni in an amount of 29% to 37%, W in an amount of 0.5% to 2.0%, Nb in an amount of more than 0% to 1.0% or less, Al in an amount of 2.0% to 4.0%, a rare earth element in an amount of 0.05% to 0.40%, Ti in an amount of 0.05 to 0.20%, and Fe and inevitable impurities as a remaining portion. The "rare earth elements" mean the 15 types of lanthanoid from La to Lu in the periodic table. The rare earth elements preferably mainly include La, and it is desirable that La makes up 80% or more of the rare earth elements, and desirably makes up 90% or more of the rare earth elements. Note that examples of the inevitable impurities include P and S, and the upper limit of these elements is 0.06% in total.

The projections 14 can be formed as overlay beads using an overlay welding method such as PPW (plasma powder welding) or plasma transferred arc welding (PTA welding) by welding powder for welding that is made of an alloy for overlay welding having the following composition on the inner surface of the tube main body 12.

An alloy containing C in an amount of 0.2% to 0.6%, Si in an amount of more than 0% to 1.0%, Mn in an amount of more than 0% to 0.6% or less, Cr in an amount of 25% to 35%, Ni in an amount of 35% to 50%, Nb in an amount of 0.5% to 2.0%, Al in an amount of 3.0% to 6.0%, Y in an amount of 0.005% to 0.05%, and Fe and inevitable impurities as a remaining portion is suitably used as the alloy for overlay welding. Note that examples of the inevitable impurities include P and S, and the upper limit of these elements is 0.01% in total.

The reason for limiting the components of the above-described alloy for overlay welding (projections) is as follows.

C: 0.2% to 0.6%

C has the function of increasing a high-temperature creep rupture strength. Thus, the alloy for overlay welding contains C in an amount of at least 0.2%. However, if the content is excessively large, the primary carbide $Cr_7C_3$ tends to be widely formed in the projections, movement of Al that forms the alumina barrier layer is suppressed, and thus Al in the base material is insufficiently supplied to the surface portion of the cast body, local tearing of the alumina barrier layer occurs, and the continuity of the alumina barrier layer is impaired. Thus, the upper limit is 0.6%. Note that the C content is more desirably 0.3% to 0.5%.

Si: more than 0% to 1.0% or less

The alloy for overlay welding contains Si as a deoxidant in order to increase the fluidity of the material during welding. However, if the alloy for overlay welding contains Si excessively, the high-temperature creep rupture strength decreases and Si is oxidized so as to cause the formation of an oxide layer with a low denseness, and the weldability decreases, and thus the upper limit of Si is 1.0%. Note that the Si content is more desirably 0.6% or less.

Mn: more than 0% to 0.6% or less

Although the alloy for overlay welding contains Mn as a deoxidant for a molten alloy in order to fix S in molten metal, if the alloy for overlay welding contains Mn excessively, a $MnCr_2O_4$ oxide film is formed and the high-temperature creep rupture strength decreases, and thus the upper limit of Mn is 0.6%. Note that the Mn content is more desirably 0.3% or less.

Cr: 25% to 35%

For the purpose of contributing to an increase in the high-temperature strength and oxidation resistance, the alloy for overlay welding contains Cr in an amount of 25% or more. However, if the alloy for overlay welding contains Cr excessively, chromium oxides ($Cr_2O_3$ and the like) are formed and the alumina barrier layer formation is inhibited, and thus the upper limit of Cr is 35%. Note that the Cr content is more desirably 27% to 33%.

Ni: 35% to 50%

Ni is an element that is needed to ensure carburization resistance, oxidation resistance, and the stability of a metal structure. Also, Ni has a function of improving the ability of regenerating an alumina barrier layer. Also, if the Ni content is low, the Fe content increases relatively, as a result of which a Cr—Fe—Mn oxide tends to be produced on the surface of the cast body, and thus the production of the alumina barrier layer is inhibited. Thus, the alloy for overlay welding contains Ni in an amount of at least 35% or more. On the other hand, if the alloy for overlay welding contains Ni in an amount of more than 50%, the effect of the increase is not further improved, and thus the upper limit of Ni is 50%. Note that the Ni content is more desirably 38% to 47%.

Nb: 0.5% to 2.0%

Nb suppresses the occurrence of weld cracks and forms NbC so as to increase the creep strength, and thus the alloy for overlay welding contains Nb in an amount of 0.5% or more. On the other hand, if Nb is excessing contained, the alumina barrier layer becomes more likely to spall off, and thus the upper limit of Nb is 2.0%. Note that the Nb content is more desirably 1.0% to 1.5%.

Al: 3.0% to 6.0%

Al is an essential material of the Al oxide that forms the alumina barrier layer. In order that the overlay welded projections 14 exhibit the ability of stably forming and regenerating the alumina barrier layer, the alloy for overlay welding contains Al in an amount of 3.0% or more. On the other hand, if the Al content exceeds 6.0%, these abilities are not further improved, and thus the upper limit of Al is 6.0%. Note that the Al content is more desirably greater than 3.0% and less than 5.0%, and even more desirably greater than 4.0% and less than 5.0%.

Y: 0.005% to 0.05%

In order to suppress meandering of weld beads and increase the weldability in overlay welding, Y is added in an amount of 0.005% or more. On the other hand, if the Y content exceeds 0.05%, the ductility of the overlay welded projections 14 will decrease, and thus the upper limit of Y is 0.05%. Note that the Y content is more desirably 0.01% to 0.03%.

Note that the alloy for overlay welding desirably contains Y in an amount of 0.002 times or more the Al content. That is, Y/Al≥0.002 holds true. Accordingly, Y can compensate for a decrease in the weldability, which is inhibited due to the addition of Al. Note that if rare earth elements that are shown below are further added thereto, it is desirable that (Y+rare earth elements)/Al≥0.002 holds true.

Moreover, the following elements can be added to the alloy for overlay welding.

Rare earth elements: 0.01% to 0.20%

"Rare earth elements" mean the 15 types of lanthanoid from La to Lu in the periodic table. The rare earth elements preferably mainly include La, and it is desirable that La makes up 80% or more of the rare earth elements, and desirably makes up 90% or more of the rare earth elements. The rare earth elements contribute to the ability of stably forming the alumina barrier layer, and thus the alloy for overlay welding contains the rare earth elements in an amount of 0.01% or more. On the other hand, if the content of rare earth elements exceeds 0.20%, this ability is not further improved, and thus the upper limit thereof is 0.20%. Note that the content of the rare earth elements is more desirably greater than 0.01% and 0.10% or less.

One or more elements selected from the group consisting of W in an amount of more than 0% to 2.0% or less, Mo in an amount of more than 0% to 1.0% or less, Ti and/or Zr in a total amount of more than 0% to 0.5% or less, and Hf in an amount of more than 0% to 0.5% or less These elements have the effect of increasing the carburization resistance, and are added in order to improve high-temperature strength. However, excessive addition thereof will reduce the ductility and the like, and thus the content is as specified above.

In the present invention, the projections 14 made of the alloy for overlay welding contain Nb, and thereby the occurrence of weld cracks is suppressed. Nb included in the alloy for overlay welding forms NbC during welding for the formation of the projections and can increase the creep strength through crystal boundary strengthening. Also, Nb binds to C so as to form NbC, and thus it is possible to reduce the concentration of carbon in the welding material and to increase the weldability.

Also, C in the formed projections forms NbC with priority, and thus the formation of Cr carbide can be suppressed. As a result, the formation of the Al oxide on the projections can be promoted by heat treatment. Because the alumina barrier layer is formed on the projections, the attachment of coke can be also suppressed, and thus it is possible to prevent pressure loss and a decrease in the heat transfer efficiency, and to also prevent a decrease in the operation efficiency caused by a decoking task.

In order to make the concentration of Nb in the formed projections 14 higher than the concentration of Nb in the tube main body 12, it is desirable that the concentration of Nb in the alloy for overlay welding is higher than the concentration of Nb in the tube main body 12. The reason is as follows: although an increase in the concentration of Al in the formed projections 14 improves the ability of forming a film, the projections need to have weldability, and thus both the film formation ability and the weldability are achieved by increasing the concentration of Nb. Note that the concentration of Nb in the projections 14 is preferably two times or more, and more preferably five times or more the concentration of Nb in the tube main body 12.

Also, the formed projections contain Al, and thus the alumina barrier layer containing the Al oxide can be suitably formed by heat treatment. This can be realized by making the Al content in the alloy for overlay welding higher than the Al content in the tube main body 12. The reason is as follows: the projections 14 are more exposed to the hydrocarbon gas compared to the inner surface of the tube main body 12, whereby the projections 14 tend to be influenced by oxidation, carburization, nitridization, and the like, and thus it is necessary to form a stable alumina barrier layer. Desirably, the Al content of the alloy for overlay welding serving as the projections 14 is 0.5% or more of the Al content of the tube main body 12.

Note that it is thought that the ability of stably forming the alumina barrier layer is improved by also increasing the Al content of the tube main body 12 as in the projections 14. However, if the Al content of the tube main body 12 is increased, the castability of the tube main body, and in particular, the castability during centrifugal casting decreases. Also, there is a risk that mechanical properties such as the creep rupture strength and the tensile ductility of the tube main body 12 will decrease. Furthermore, although a plurality of the reaction tubes 10 are joined through welding and are installed in the heating furnace, if the Al content of the tube main body 12 increases, the weldability decreases. Therefore, in the present invention, the Al content of the tube main body 12 is reduced compared to the Al content in the alloy for overlay welding serving as the projections 14.

As described above, the alloy for overlay welding contains Nb, Al, and Y, and thus has excellent weldability, and the projections 14 formed by this alloy for overlay welding has a high creep strength and is capable of improving the ability of stably forming the alumina barrier layer. Thus, the projections 14 exhibit excellent oxidation resistance, carburization resistance, nitridization resistance, and the like during use in a high-temperature atmosphere. Also, it is possible to prevent coke from attaching to the projections 14, and thus to prevent a decrease in the heat transfer efficiency and pressure loss. Furthermore, attachment of coke is suppressed, and thus it is possible to reduce the frequency of a decoking task and achieve an increase in the operation efficiency.

The reaction tube 10 provided with the projections 14 on the inner surface using the alloy for overlay welding of the present invention can be manufactured in the following manner, for example.

<Casting of Tube Main Body 12>

The tube main body 12 is cast into a tubular shape by smelting molten metal having the above-described component composition, centrifugal casting, static casting, or the like. The present invention is particularly suitable for a tube main body produced through centrifugal casting. The reason is as follows: by applying centrifugal casting, a minute metal structure grows with an orientation in the diameter direction as cooling using a mold progresses, and thus an alloy structure in which Al easily moves can be obtained. Accordingly, in heat treatment, which will be described later, it is possible to obtain the tube main body 12 provided with a film having an excellent strength even in an environment in which the tube main body 12 is repeatedly heated, even though the film is an alumina barrier layer that is thinner than a conventional film.

<Machining>

After the obtained tube main body 12 is cut to a predetermined dimension and bending is corrected by unbending, rough processing is performed on the inner surface and edge preparation for welding is performed on an end portion.

<Overlay Welding for Projections 14>

Next, powder constituted by the alloy for overlay welding with the above-described composition is overlay welded on the inner surface of the tube main body 12 through PPW, PTA welding, or the like. The alloy powder for overlay welding contains Y in the above-described range, and thus meandering of the weld beads is suppressed and the alloy powder for overlay welding has a good weldability. Accordingly, the reaction tube 10 in which the projections 14 are overlay welded on the inner surface of the tube main body 12 is obtained.

<Inner Surface Precision Processing>

Surface oxides remain on the inner surface of the tube main body 12 and the surface of the projections 14 in a welded metal portion generated in the overlay welding for the projections 14 and the periphery thereof. These oxides are removed by grinding. In the present invention, the projections have excellent weldability and thus oxides can be easily removed therefrom, and the Al oxide formation ability can be improved. Examples of a grinding method include surface grinding, grinder polishing, and blasting. In particular, blasting has excellent workability in the case where the inner surface has projections.

<Heat Treatment>

The reaction tubes 10 are subjected to heat treatment in an oxidizing atmosphere after inner surface precision processing is performed on the inner surfaces of the reaction tubes 10, and thereby the alumina barrier layer is formed on the inner surface of the tube main body 12 and the surfaces of the projections 14. Note that this heat treatment can be implemented as an independent process, and can be implemented also in a high-temperature atmosphere when the reaction tubes 10 are installed and used in a heating furnace.

Heat treatment is implemented in an oxidizing atmosphere. "Oxidizing atmosphere" refers to an oxidizing environment in which oxidizing gas or steam containing oxygen in an amount of 20 vol %, or $CO_2$ are mixed.

By performing heat treatment, the inner surface of the tube main body 12 and the surfaces of the projections 14 come into contact with oxygen, and Al, Cr, Ni, Si, and Fe that are distributed on the surface of the base are oxidized so as to form an oxide layer. By performing heat treatment in a suitable temperature range of 800° C. or more for 1 hour or longer, Al forms oxides ($Al_2O_3$) with priority over Cr, Ni, Si, and Fe on the inner surface of the tube main body 12 and the surfaces of the projections 14, and the alumina barrier layer mainly constituted by the Al oxide is formed. In particular, the projections 14 contain Nb and form NbC with priority, and thereby C is consumed, and it is possible to suppress the production of Cr carbide that inhibits the formation of the alumina barrier layer and to promote the formation of the alumina barrier layer.

The reaction tubes 10 of the present invention are capable of maintaining excellent oxidation resistance, carburization resistance, nitridization resistance, and corrosion resistance during use in a high-temperature atmosphere due to the alumina barrier layer formed on the inner surface of the tube main body 12 and the surfaces of the projections 14. Also, the tube main body 12 contains Al in a smaller amount than the projections 14, and thus the tube main body 12 has excellent mechanical properties and weldability when the tube main body 12 is installed in a heating furnace. Thus, it is possible to significantly increase the lifetime of the reaction tubes 10 and to increase the operation efficiency as much as possible.

Furthermore, the projections 14 have excellent weldability and thus meandering and weld cracks do not occur, as a result of which oxides can be easily removed when oxides of the projections 14 are removed by blast processing or the like, and it is possible to improve the ability of forming an Al oxide. Suitable formation of the Al oxide on the projections 14 makes it possible to reduce the occurrence of coking, to increase the thermal cracking efficiency, and to increase the yield of olefins.

Working Examples

A molten alloy (Table 1: ladle analysis) in the tube main body 12 was smelted through atmospheric melting in a high-frequency induction furnace, the tube main bodies 12 (Sample Tubes 1 to 3) were produced through centrifugal casting, rough processing was performed on the inner surfaces, and machining was performed. The obtained sample tube s had an inner diameter of 80 mm, an outer diameter of 100 mm, and a length of 3 m.

TABLE 1

|  | C | Si | Mn | Cr | Ni | W | Nb | Al | La | Ti | Fe |
|---|---|---|---|---|---|---|---|---|---|---|---|
| Sample Tube 1 | 0.44 | 0.32 | 0.22 | 23.78 | 34.13 | 0.99 | 0.07 | 3.33 | 0.26 | 0.14 | Bal. |
| Sample Tube 2 | 0.43 | 0.27 | 0.14 | 23.57 | 33.93 | 1.12 | 0.12 | 3.33 | 0.24 | 0.13 | Bal. |
| Sample Tube 3 | 0.44 | 0.29 | 0.13 | 23.99 | 34.42 | 1.05 | 0.13 | 3.29 | 0.23 | 0.14 | Bal. |

The obtained sample tubes were each divided into four parts in the diameter direction, and the projections 14 were overlay welded using alloy powder for overlay welding listed in Table 2 through PPW (Inventive Examples 1 to 4, Comparative Examples 1 to 3). Note that (Y+rare earth elements)/Al are collectively listed in Table 2.

TABLE 3

|  | Weldability | $Al_2O_3$ Formation ability | Comprehensive evaluation |
|---|---|---|---|
| Inventive Ex. 1 | A | 94 | A |
| Inventive Ex. 2 | A | 91 | A |
| Inventive Ex. 3 | A | 95 | A |
| Inventive Ex. 4 | A | 89 | A |
| Comp. Ex. 1 | A | 0 | C |
| Comp. Ex. 2 | C | 89 | C |
| Comp. Ex. 3 | B | 95 | B |

Figure 3:
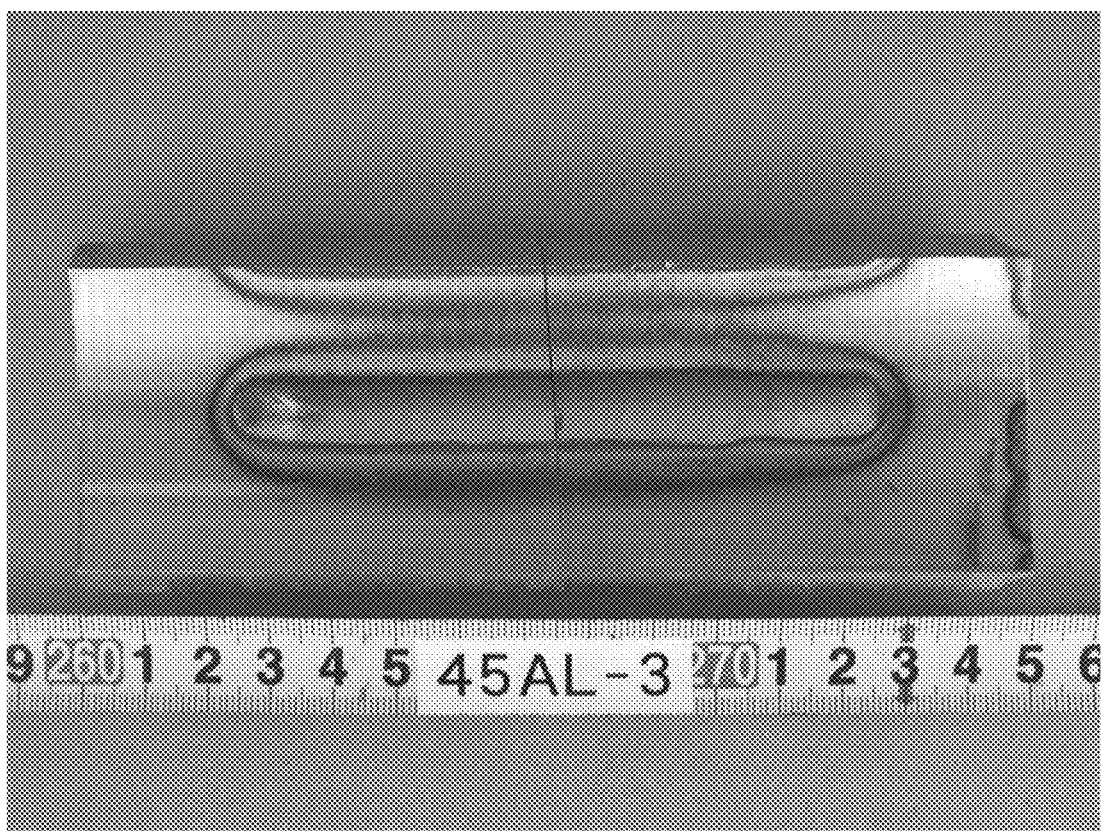
FIG. 3 is a photograph of Comparative Example 1.

Referring to FIGS. 2 to 5 and Table 3, it is found that the projections of the inventive examples were formed linearly without meandering and had excellent weldability (Evaluation A). On the other hand, with regard to the comparative examples, Comparative Example 1 had excellent weldability (Evaluation A), but in Comparative Example 2, significant meandering occurred on the projections, and Comparative Example 2 had extremely poor weldability (Evaluation C). Also, in Comparative Example 3, no significant meandering occurred on the projections, but a lot of minute warping was found, and Comparative Example 3 had a moderate degree of linearity (Evaluation B).

TABLE 2

|  | Tube main body | C | Si | Mn | P | S | Cr | Ni | W | Nb | Al | rare earth | Y | N | Fe | (Y + rare earth)/Al |
|---|---|---|---|---|---|---|---|---|---|---|---|---|---|---|---|---|
| Inventive Ex. 1 | Sample Tube 2 | 0.45 | 0.36 | 0.09 | 0.003 | 0.002 | 31.77 | 42.28 | 0.02 | 1.32 | 4.24 | <0.01 | 0.010 | 0.013 | Bal. | 0.0024 |
| Inventive Ex. 2 | Sample Tube 1 | 0.45 | 0.35 | 0.10 | 0.003 | 0.002 | 31.68 | 42.14 | 0.02 | 1.34 | 3.23 | <0.01 | 0.014 | 0.013 | Bal. | 0.0043 |
| Inventive Ex. 3 | Sample Tube 3 | 0.44 | 0.28 | 0.09 | 0.002 | <0.001 | 31.18 | 42.84 | — | 1.27 | 4.18 | 0.018 | 0.013 | 0.018 | Bal. | 0.0074 |
| Inventive Ex. 4 | Sample Tube 3 | 0.44 | 0.93 | 0.10 | 0.002 | 0.002 | 31.46 | 42.68 | — | 1.37 | 4.15 | 0.009 | 0.008 | 0.018 | Bal. | 0.0041 |
| Comp. Ex. 1 | Sample Tube 1 | 0.44 | 1.60 | 1.00 | 0.001 | 0.002 | 31.45 | 42.78 | 0.08 | 1.30 | 1.08 | — | — | 0.094 | Bal. | 0.0000 |
| Comp. Ex. 2 | Sample Tube 1 | 0.46 | 0.34 | 0.10 | 0.003 | 0.005 | 31.78 | 42.21 | 0.02 | 1.37 | 4.22 | <0.01 | <0.01 | 0.011 | Bal. | 0.0000 |
| Comp. Ex. 3 | Sample Tube 1 | 0.45 | 0.35 | 0.10 | 0.003 | 0.005 | 31.77 | 42.18 | 0.02 | 1.39 | 3.21 | <0.01 | <0.01 | 0.014 | Bal. | 0.0000 |

* "<0.01" or "—" indicates a measurement lower limit or less.
* "W" indicates the total amount of W + Ti + Zr.

The sample tubes provided with projections (Inventive Examples 1 to 4, Comparative Examples 1 to 3) are shown in FIGS. 2 to 5. Referring to the drawings, it is found that all of the projections were formed on the inner surfaces of the sample tubes through overlay welding.

The weldability during overlay welding was evaluated visually in that stage. The weldability was judged as Evaluation A to Evaluation C based on whether or not the linearity was excellent, that is, based on the degree of meandering of the projections. The results are listed in Table 3.

The reason why the inventive examples had excellent weldability was that the inventive examples contained a large amount of Al that inhibits the weldability, but Y was added in an amount that compensates for the inhibition effect. Note that (Y+rare earth elements)/Al was 0.002 or more in all of the examples (Table 2). On the other hand, no Y was added to Comparative Example 1, but the Al content that inhibits the weldability was low, and thus similarly, Comparative Example 1 was given Evaluation A. Also, a large amount of Al that inhibits the weldability was added to Comparative Example 2, but Comparative Example 2 did not contain Y that compensates for the inhibition effect, and (Y+rare earth elements)/Al was also 0, and thus the projections meandered, and Comparative Example 2 was evaluated as C. Also, Comparative Example 3 did not contain Y, but the Al content was low, and thus Comparative Example 3 had better weldability than Comparative Example 2 and was evaluated as B.

Next, the ability of forming an alumina barrier layer was evaluated with regard to the inventive examples and comparative examples. Specifically, the formation ability was evaluated by subjecting the projections to surface grinding, grinder polishing, or blasting, performing processing for heating and cooling the furnace in an oxidizing air atmosphere (oxygen was approximately 21%) so as to form an alumina barrier layer on the surface of the projections, and measuring the area % of the formed alumina barrier layer. The alumina barrier layer formation ability of each sample material was collectively listed in Table 3.

Referring to Table 3, it is found that in all of the inventive examples and Comparative Examples 2 and 3, the alumina barrier layer formation ability was as high as 90 area % or more, and the inventive examples and Comparative Examples 2 and 3 had an excellent alumina barrier layer formation ability. It is thought that the reason is as follows: those examples contained a lot of Al, Nb formed Nb C, and the formation of Cr carbide that inhibits the formation of the Al oxide was suppressed. On the other hand, Comparative Example 1 contained little of the Al that forms the Al oxide, and thus the alumina barrier layer was not formed. Also, it is thought that Comparative Example 3 had a lot of Al and Nb, but had a poor weldability, and thus, the surfaces of the projections were significantly rough even through surface grinding, and the formation of the Al oxide was inhibited.

<Comprehensive Evaluation>

The inventive examples and comparative examples were comprehensively evaluated, and the evaluations are listed in "Comprehensive Evaluation" in Table 3. Referring to Table 3, the projections of the inventive examples had excellent weldability, and had an alumina barrier layer formation ability of 90% or more, and thus the comprehensive evaluation was A. That is, in the reaction tubes 10 of the present invention, the projections 14 had excellent weldability, and thus oxides can be easily removed when oxides of the projections are removed by blast processing or the like, and it is possible to improve the ability of forming the Al oxide. Accordingly, it is possible to suppress the occurrence of coking, increase the thermal cracking efficiency, and as a result, increase the yield of olefins. Also, a good alumina barrier layer is formed not only on the tube main body 12 but also on the projections 14, and thus the alumina barrier layer is unlikely to spall off therefrom even if the alumina barrier layer is subjected to repeated cycles of heating and cooling. Thus, the tube main body 12 and the projections 14 have excellent oxidation resistance, carburization resistance, nitridization resistance, corrosion resistance, coking resistance, and the like for a long time during use in a high-temperature atmosphere, and have excellent mechanical properties such as creep rupture strength and tensile ductility, and the weldability for the reaction tubes 10 is excellent. Furthermore, coking is unlikely to occur on the tube main body 12 and the projections 14, and thus it is possible to reduce the time and the frequency of maintenance such as a decoking task, and to increase the operation efficiency as much as possible.

On the other hand, the comparative examples had poor weldability and a poor alumina barrier layer formation ability, and thus when they are used as thermal cracking tubes, coking occurs, and they have poor oxidation resistance, carburization resistance, and nitridization resistance. Thus, the comprehensive evaluation was B or C.

The above description is for describing the present invention, and should not be interpreted as limiting or restricting the scope of claims of the present invention. Furthermore, it goes without saying that the configurations of the constituent elements of the present invention are not limited to those in the working examples, and that various modifications are possible within the technical scope of the claims.

What is claimed is:

1. A reaction tube comprising a tube main body having an inner surface and an overlay-welded projection formed at the inner surface of the tube main body,
   the tube main body being made of a heat-resistant alloy containing Nb in an amount of more than 0 mass % to 1.0 mass % or less, and
   the projection consisting essentially of C in an amount of 0.2 mass % to 0.6 mass %, Si in an amount of more than 0 mass % to 1.0 mass %, Mn in an amount of more than 0 mass % to 0.6 mass % or less, Cr in an amount of 25 mass % to 35 mass %, Ni in an amount of 35 mass % to 50 mass %, Nb in an amount of 0.5 mass % to 2.0 mass %, Al in an amount of greater than 4.0 mass % to 6.0 mass %, Y in an amount of 0.005 mass % to 0.05 mass %, and Fe and inevitable impurities as a remaining portion, wherein the amount of Nb in the projection is at least two times the amount of Nb contained in the tube main body.

2. The reaction tube according to claim 1,
   wherein the amount of Nb contained in the projection is at least five times the amount of Nb contained in the tube main body.

3. The reaction tube according to claim 1,
   wherein the amount of Nb contained the projection is at least 9.77 times the amount of Nb contained in the tube main body.

4. The reaction tube according to claim 1,
   wherein the tube main body further comprises Ni in an amount of 29 mass % to 37 mass %.

5. The reaction tube according to claim 2,
   wherein the tube main body further comprises Ni in an amount of 29 mass % to 37 mass %.

6. The reaction tube according to claim 3,
   wherein the tube main body further comprises Ni in an amount of 29 mass % to 37 mass %.

7. The reaction tube according to claim 1,
   wherein the projection further comprises a rare earth element in an amount of 0.01 mass % to 0.20 mass %.

8. The reaction tube according to claim 2,
   wherein the projection further comprises a rare earth element in an amount of 0.01 mass % to 0.20 mass %.

9. The reaction tube according to claim 3,
   wherein the projection further comprises a rare earth element in an amount of 0.01 mass % to 0.20 mass %.

10. The reaction tube according to claim 1,
    wherein the projection further comprises one or more elements selected from the group consisting of W in an amount of more than 0 mass % to 2.0 mass % or less, Mo in an amount of more than 0 mass % to 1.0 mass % or less, Ti and/or Zr in a total amount of more than 0 mass % to 0.5 mass % or less, and Hf in an amount of more than 0 mass % to 0.5 mass % or less.

11. The reaction tube according to claim 2,
    wherein the projection further comprises one or more elements selected from the group consisting of W in an amount of more than 0 mass % to 2.0 mass % or less, Mo in an amount of more than 0 mass % to 1.0 mass % or less, Ti and/or Zr in a total amount of more than 0 mass % to 0.5 mass % or less, and Hf in an amount of more than 0 mass % to 0.5 mass % or less.

12. The reaction tube according to claim 3,
wherein the projection further comprises one or more elements selected from the group consisting of W in an amount of more than 0 mass % to 2.0 mass % or less, Mo in an amount of more than 0 mass % to 1.0 mass % or less, Ti and/or Zr in a total amount of more than 0 mass % to 0.5 mass % or less, and Hf in an amount of more than 0 mass % to 0.5 mass % or less.

13. The reaction tube according to claim 1,
wherein the tube main body further comprises Al in an amount of 2.0 mass % or more, and
the amount of Al in the projection is higher than that in the tube main body.

14. The reaction tube according to claim 2,
wherein the tube main body further comprises Al in an amount of 2.0 mass % or more, and
the amount of Al in the projection is higher than that in the tube main body.

15. The reaction tube according to claim 3,
wherein the tube main body further comprises Al in an amount of 2.0 mass % or more, and
the amount of Al in the projection is higher than that in the tube main body.

16. The reaction tube according to claim 1,
wherein the tube main body further comprises Al in an amount of 2.0 mass % or more,
the inner surface of the tube main body is provided with an aluminum barrier layer containing an Al oxide, and
the projection is provided on a surface thereof with an aluminum barrier layer containing an Al oxide.

17. The reaction tube according to claim 2,
wherein the tube main body further comprises Al in an amount of 2.0 mass % or more,
the inner surface of the tube main body is provided with an aluminum barrier layer containing an Al oxide, and
the projection is provided on a surface thereof with an aluminum barrier layer containing an Al oxide.

18. The reaction tube according to claim 3,
wherein the tube main body further comprises Al in an amount of 2.0 mass % or more,
the inner surface of the tube main body is provided with an aluminum barrier layer containing an Al oxide, and
the projection is provided on a surface thereof with an aluminum barrier layer containing an Al oxide.

* * * * *